United States Patent
Winker et al.

(10) Patent No.: US 12,485,746 B2
(45) Date of Patent: Dec. 2, 2025

(54) CLOSURE DEVICE FOR A CHARGING OR TANK FLAP OF AN AUTOMOTIVE VEHICLE

(71) Applicant: Minebea Mitsumi, Inc., Nagano (JP)

(72) Inventors: Martin Winker, Wurmlingen (DE); Fabian Sekinger, Eschbronn-Mariazell (DE); Stefan Lindhuber, Munich (DE)

(73) Assignee: MINEBEA MITSUMI, INC., Nagano (JP)

(*) Notice: Subject to any disclaimer, the term of this patent is extended or adjusted under 35 U.S.C. 154(b) by 512 days.

(21) Appl. No.: 18/055,066

(22) Filed: Nov. 14, 2022

(65) Prior Publication Data
US 2023/0151668 A1     May 18, 2023

(30) Foreign Application Priority Data
Nov. 17, 2021   (DE) .................... 102021129941.1

(51) Int. Cl.
*B60K 15/05*     (2006.01)
*B60L 53/16*     (2019.01)
*E05F 15/60*     (2015.01)

(52) U.S. Cl.
CPC ...... *B60K 15/05* (2013.01); *B60K 2015/0523* (2013.01); *B60K 2015/0538* (2013.01); *B60L 53/16* (2019.02); *E05F 15/60* (2015.01); *E05Y 2900/534* (2013.01)

(58) Field of Classification Search
CPC ............ B60K 15/05; B60K 2015/0515; B60K 2015/0523; B60K 2015/0538; E05Y 2900/534; E05F 15/67; E05F 15/665; E05F 15/635; E05F 15/638

USPC ................. 296/97.22; 220/86.2, DIG. 33
See application file for complete search history.

(56) References Cited

U.S. PATENT DOCUMENTS

| 10,577,845 | B2 | 3/2020 | Herczeg | |
|---|---|---|---|---|
| 2017/0356228 | A1* | 12/2017 | Herczeg | B60K 15/05 |
| 2021/0246701 | A1* | 8/2021 | Shin | E05D 15/165 |

(Continued)

FOREIGN PATENT DOCUMENTS

| CN | 111605420 A | * | 9/2020 | B60L 53/16 |
|---|---|---|---|---|
| CN | 114852189 A | * | 8/2022 | |

(Continued)

OTHER PUBLICATIONS

Li et al. (CN 111605420 A), machine translation (Year: 2020).*
Potier et al. (FR 2968345 A1), machine translation (Year: 2012).*

*Primary Examiner* — Daniel J Colilla
*Assistant Examiner* — Wenwei Zhuo
(74) *Attorney, Agent, or Firm* — Grossman, Tucker, Perreault & Pfleger, PLLC

(57) ABSTRACT

The invention is based on a closure device for a charging or tank flap of an automotive vehicle, comprising a flap element, comprising a drive unit including an electrical actuator for traversing the flap element between a closed position and an open position and a guide unit disposed within a body of the automotive vehicle, wherein the guide unit includes two guide rails extending in parallel to one another and two carriages arranged to be traversable on the guide rails, on which the flap element is arranged.

The drive unit may include at least one gear unit for the synchronous transmission, to both carriages, of a drive movement generated by the actuator.

14 Claims, 17 Drawing Sheets

(56) References Cited

U.S. PATENT DOCUMENTS

| | | | |
|---|---|---|---|
| 2023/0311642 A1* | 10/2023 | Sun | B60K 15/05 |
| | | | 296/97.22 |
| 2023/0382217 A1* | 11/2023 | Kaneko | E05D 15/20 |
| 2024/0313466 A1* | 9/2024 | Zeidler | B60K 1/00 |
| 2025/0018787 A1* | 1/2025 | Yu | B60K 15/05 |

FOREIGN PATENT DOCUMENTS

| | | | | |
|---|---|---|---|---|
| CN | 118220349 A * | 6/2024 | | B60K 15/05 |
| DE | 102016110869 A1 | 12/2017 | | |
| DE | 102017212396 A1 * | 1/2019 | | B60K 15/05 |
| DE | 102017212397 A1 * | 1/2019 | | B60K 15/05 |
| DE | 102020130235 A1 | 5/2022 | | |
| DE | 102020134314 A1 | 6/2022 | | |
| EP | 4019312 A1 * | 6/2022 | | B60K 15/05 |
| FR | 2968345 A1 * | 6/2012 | | E05F 15/605 |
| WO | WO-2021004147 A1 * | 1/2021 | | B60K 15/05 |

* cited by examiner

CLOSURE DEVICE FOR A CHARGING OR TANK FLAP OF AN AUTOMOTIVE VEHICLE

BACKGROUND

The invention relates to a closure device for a charging or tank flap of an automotive vehicle.

From DE 10 2016 110 869 A1, a closure device for a charging or tank flap of an automotive vehicle comprising a flap element and a guide unit disposed within a body of the automotive vehicle is already known. The flap element is traversable between a closed position and an open position along the guide unit by means of a push-pull cable, wherein the guide unit is formed in such a manner that the flap element performs a traversing motion and a lifting motion during the movement between the closed position and the open position. In the open position, the flap element is disposed within the body of the automotive vehicle.

It is an object of the present invention to provide a generic closure device for a charging or tank flap of an automotive vehicle with good properties regarding precise and reliable opening and closing of the charging or tank flap. The object is achieved by the features of claim 1. Examples of the invention are indicated in the dependent claims.

DISCLOSURE

The invention is based on a closure device for a charging or tank flap of an automotive vehicle, comprising a flap element, comprising a drive unit including an electrical actuator for traversing the flap element between a closed position and an open position and a guide unit disposed within a body of the automotive vehicle, wherein the guide unit includes two guide rails extending in parallel to one another and two carriages arranged to be traversable on the guide rails, on which the flap element is arranged.

The drive unit may include at least one gear unit for the synchronous transmission, to both carriages, of a drive movement generated by the actuator.

The closure device is provided, in particular, to close a charging connector or a filler pipe by means of a flap element when the automotive vehicle is not being filled up or charged, respectively, and to expose the charging connector or the filler pipe by traversing the flap element from a closed position to an open position to enable a filling operation or a charging operation, respectively. "Provided" should be understood to mean, in particular, especially programmed, configured and/or equipped. That an object is provided for a particular function should be understood to mean, in particular, that the object fulfills and/or performs this particular function in at least one application and/or operating state. The flap element is provided, in particular, to close an opening in the body of the vehicle, behind which the charging connector or the filler pipe, respectively, is arranged, in a largely water- and/or dirt-tight manner, in particular, in the closed position.

Traversing of the flap element is performed by means of a drive unit, which is fully disposed within a body of the automotive vehicle. The drive unit comprises a guide unit having two guide rails, which extend within the body of the automotive vehicle. In particular, the guide rails extend essentially parallel to one another. "Essentially parallel" should be understood to mean, in particular, an alignment in a direction relative to a reference direction, in particular in a plane, wherein the direction deviates from the reference direction by less than 2°, particularly less than 1°, and more particularly less than 0.5°. The guide rails define the traversing path of the flap element during opening or closing of the charging or tank flap of the automotive vehicle. Each of the guide rails has a traversing region and a lifting region. During an opening operation, the flap element is traversed away from the body opening along a traversing region of the guide rails and, during a closing operation, the flap element is traversed toward the body opening within the body along the traversing region of the guide rails. During traversal of the flap element along the traversing regions of the guide rails, the flap element performs a traversing motion extending at least essentially parallel to the body of the automotive vehicle. The lifting region of the guide rails is arranged in the region of the body opening to be closed. In the lifting region, the flap element performs a lifting motion at least essentially perpendicular to the traversing motion. The expression "essentially perpendicular" is to define, in particular, an alignment in a direction relative to a reference direction, wherein the direction and the reference direction define an angle of 90°, in particular as viewed in a plane, and the angle has a maximum deviation of, in particular, less than 5°, particularly less than 2° and more particularly less than 1°. During an opening operation, the flap element is at first displaced in a direction almost perpendicular to the access opening by a lowering movement, so that the flap element is offset in parallel toward the interior of the body of the automotive vehicle. The subsequent traversing motion then causes the flap element to be displaced almost in parallel to the body, thus exposing the access opening. Correspondingly, during a closure operation, the flap element is first displaced by the traversing motion in parallel to the body toward the access opening, and subsequently lifted into the access opening by the lifting motion, thus closing the same.

The drive unit also includes an electric actuator for the generation of a drive movement for driving the flap element. In addition, the drive unit includes two carriages, each one of which being arranged to be traversable on the guide rails. The flap element is arranged between the guide rails and linked to the carriage via pivotable connecting elements. Due to the connection to the flap element, moving the carriages along the guide rails causes a movement of the flap element. The guide rails have guide grooves in which guide pins of the flap element engage. This causes rail-guiding of the flap element. The guiding pins of the flap element are passed, in particular, through an opening in the connecting elements through the connecting elements into the guide grooves of the guide rails. In particular, the connecting elements are pivotable about the passed-through guiding pins of the flap element. At an end opposite to the passed-through guiding pins of the flap element, the connecting elements are pivotably supported on the carriages. The carriages include, in particular, pivoting axles integrally formed therewith, which protrude, in particular, into corresponding openings of the connecting elements. At the transition from the traversing region to the lifting region of the guide rails, the guide grooves have a change in direction toward the access opening. The change in direction is at least essentially by 90°. The path of the guide grooves in the lifting region is thus at least essentially perpendicular to the path of the guide grooves in the traversing region. During a closing operation, the guiding pins of the flap element follow the guide grooves, wherein the change in direction of the guide grooves causes pivoting of the connecting elements about the pivoting axles of the carriage elements in the direction toward the access opening. Pivoting of the connecting elements, in turn, causes a lifting motion of the flap element connected to the connecting elements toward the access opening. The connecting elements assume a toggle-joint position in the closed position of the flap element, thus achieving self-locking of the flap element. In a corresponding fashion, during an opening operation, the change in direction of the guide grooves causes pivoting of the connecting elements about the pivoting axles of the carriage elements away from the access opening, thus causing a lowering motion of the flap element linked to the connecting elements away from the access opening.

To convert the drive movement generated by the actuator into a movement of the flap element, the drive unit has at least one, in particular, one-gear or multi-gear gear unit. The at least one gear unit is arranged, in particular, at one of the guide rails. In particular, the at least one gear unit is directly driven by the actuator. The gear unit does not directly cooperate with the flap element, but transmits the drive motion to the carriages, to which the flap element is linked. The movement of the carriages, in turn, causes movement of the flap element linked to the carriages. In particular, the gear unit is provided to convert a rotary drive movement of the actuator to a translatory movement of the carriages along the guide rails. The drive movement may be synchronously transmitted to both carriages so that there is a synchronous operation of the carriages.

To detect an opening request, strain gauges can be provided which can be arranged, in particular, at at least one of the guide rails. Pressing on the covering element will lead, in particular, to deformation of the guide rails, which can be detected by the strain gauges. This can be used to detect an opening request, and the actuator can be controlled accordingly. To traverse the covering element even in a deenergized state of the actuator from a closed position to an open position, an emergency unlocking device is provided. To operate the emergency unlocking device, the latter includes an emergency unlocking pull. Pulling on the emergency unlocking pull results in a further element connected to the emergency unlocking pull of the emergency unlocking device to act on at least one of the carriages in such a manner that it is displaced along the guide rail by a certain distance. This moves the connecting elements out of the toggle-joint position and releases the self-locking of the flap element so that the flap element can be manually further moved and the charging or tank flap can be opened even when the actuator is not energized.

Such an example enables a generic closure device for a charging or tank flap of an automotive vehicle to be provided with regard to a precise and reliable opening and closing of the charging or tank flap of the automotive vehicle. In particular by using at least one gear unit for driving the carriages to which the flap element is linked, precise and reliable traversal of the flap element and thus precise and reliable opening and closing of the charging or tank flap can be achieved.

Moreover, for each of the carriages to have a rack, each of the racks may be provided with a pinion gear directly or indirectly driven by the actuator, and provided to convert a rotatory movement of each of the gears to a movement of each of the carriages along one of the guide rails. The racks may be integrally formed with the carriage elements. The racks extend, in particular, over the entire length of the carriages. In particular, a rack of at least one of the carriages meshes with a pinion gear directly or indirectly driven by the actuator in each traversing position of the carriages, or in each traversing position of the flap element connected to the carriages. In particular, the racks of both carriages can mesh with a pinion gear directly or indirectly driven by the actuator in each traversing position of the carriages, or in each traversing position of the flap element connected to the carriages. This enables a rotatory movement generated by the actuator to be converted to a movement of the carriages along the guide rails.

In one example, the drive unit may include a cross shaft driven by the at least one gear unit, the cross shaft extending between the two guide rails and being rotatably supported in the guide rails, wherein the cross shaft bears a pinion gear on each of its ends, each meshing with a rack of each carriage. The gears of the cross shaft are fitted on the ends of the cross shaft, in particular, in a torque-resistant manner. In particular, the gears are integrally formed with the cross shaft. One gear of the cross shaft meshes, in particular, with a gear of the gear unit. The rotatory movement generated by the actuator is transmitted to the cross shaft via the gear unit thus causing a rotatory movement of the cross shaft. The gears of the cross shaft transmit the rotatory movement of the cross shaft to the racks of the carriages, and thus the carriages are moved along the guide rails. The cross shaft is supported, in particular, in the guide rails by means of plain bearings. This allows easy synchronous driving and thus a synchronous operation of the carriages to be achieved In an example, the drive unit may include two gear units, each arranged on one of the guide rails and provided to synchronously transmit a drive movement of the actuator to both carriages. The two gear units are arranged opposite one another at the guide rails. The two gear units are identically formed in particular as regards their gear ratio. In particular, only one of the gear units is directly driven by the actuator. The two gear units are coupled to one another from a drive point of view so that a drive movement from the gear unit directly driven by the actuator is transmitted to the other gear unit. Each of the gear units may directly drive at least one gear, each of the pinion gears meshing with a rack of a carriage. By using two gear units, each driving one of the carriages, easy synchronous driving of the two carriages can be achieved.

It is also provided that the drive unit includes a cross shaft driven by a first one of the gear units, the cross shaft transmitting a rotatory movement of a gear of the first gear unit to an input gear of the second gear unit. By these means, a synchronous operation of the gear units and thus a synchronous operation of the carriages driven by means of the gear units can be achieved. The cross shaft driven by the first gear unit may comprise a pinion gear on the actuator side which meshes with the rack of the actuator-side carriage as a function of a traversing position of the actuator-side carriage. In particular, the actuator-side gear of the cross shaft is provided to carry out driving of the carriage when the latter is traversed out of the engagement region of a first gear driving the carriage directly driven by the gear unit. This allows a carriage to be traversed along a guide rail over a large traversing distance.

Furthermore, it is provided for the drive unit to include a cross shaft extending between the two carriages and whose ends are rotatably supported in the carriages, wherein the cross shaft is driven by moving at least one of the carriages. Preferably, each of the guide rails of the guide unit has one rack, and the cross shaft has a pinion gear at each of its ends, each meshing with a rack of one of the guide rails. By these means, a synchronous operation of the carriages can be achieved.

The closure device according to the invention is not limited to the above-described application and examples. In particular, the closure device according to the invention, to fulfill a mode of operation described herein, can include a number of individual elements, components and units deviating from the number mentioned herein.

DRAWING

Further advantages can be derived from the following description of the drawings. In the drawings, two examples of the invention are shown. The drawings, the description and the claims comprise numerous features in combination. The person skilled in the art will suitably also regard the features in isolation and combine them to further sensible combinations.

DESCRIPTION OF THE EXAMPLES

Figure 1:
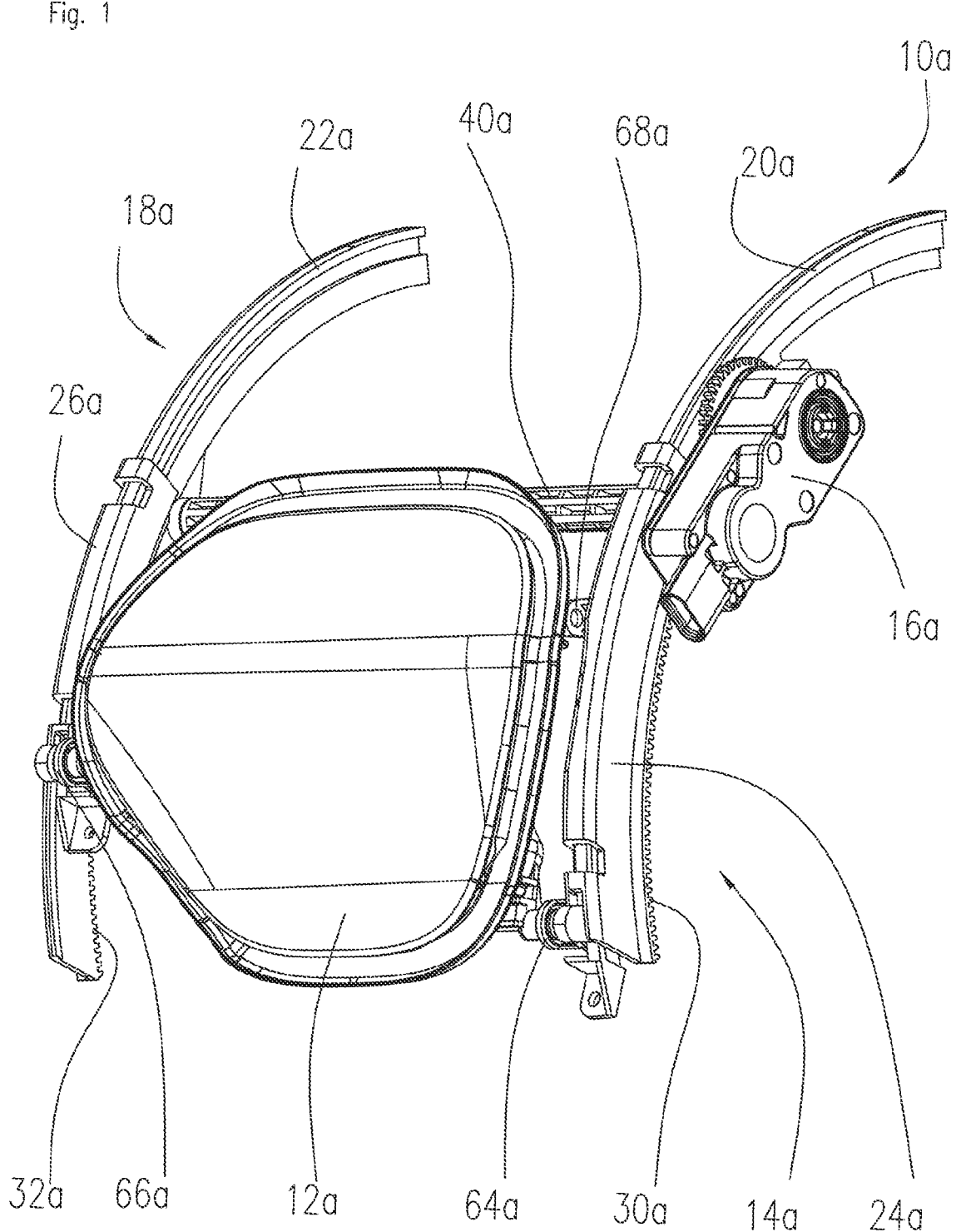
FIG. 1 shows a perspective view of a closure device for a charging or tank flap.
Figure 2:
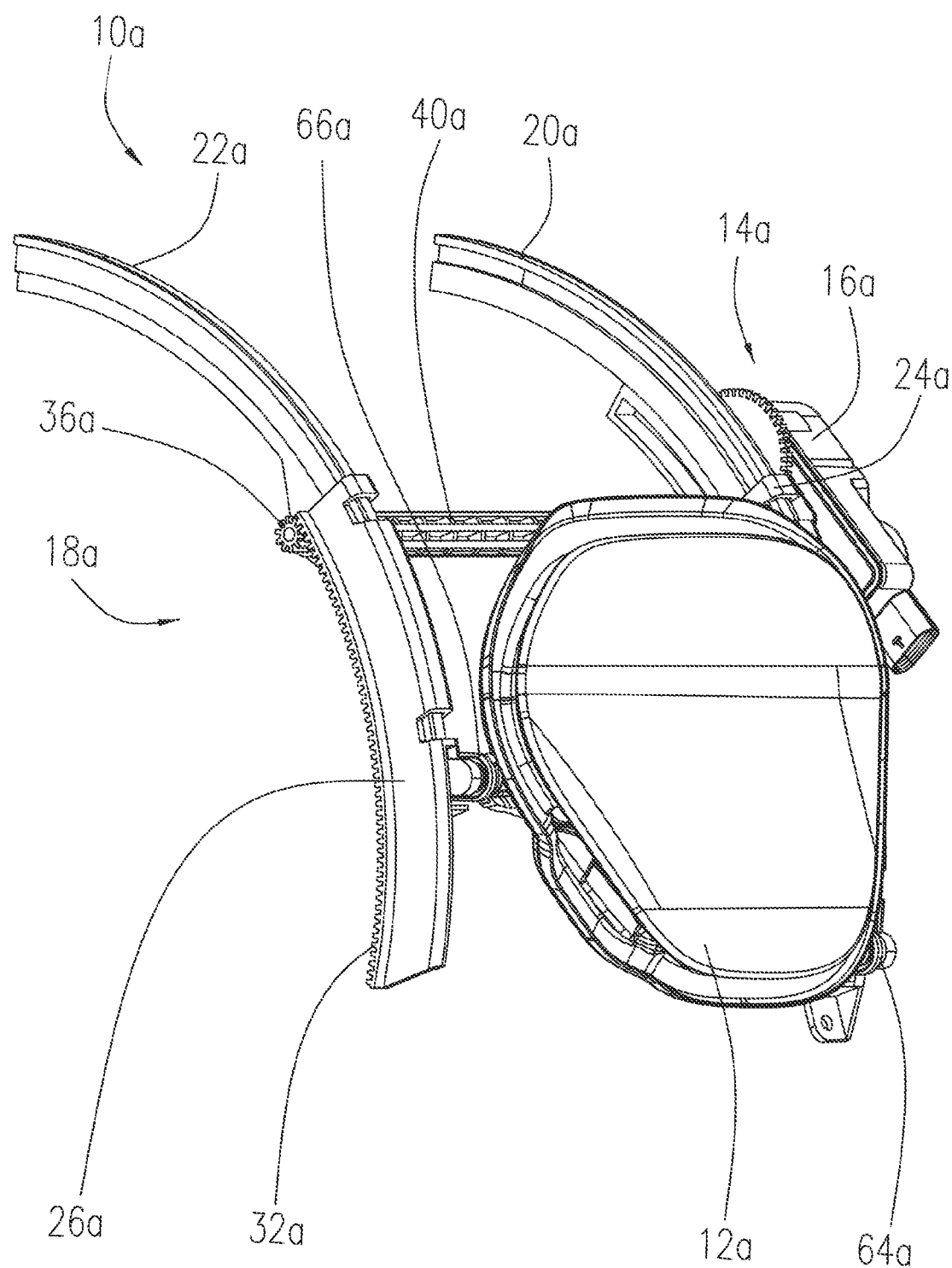
FIG. 2 shows a further perspective view of the closure device.
Figure 3:
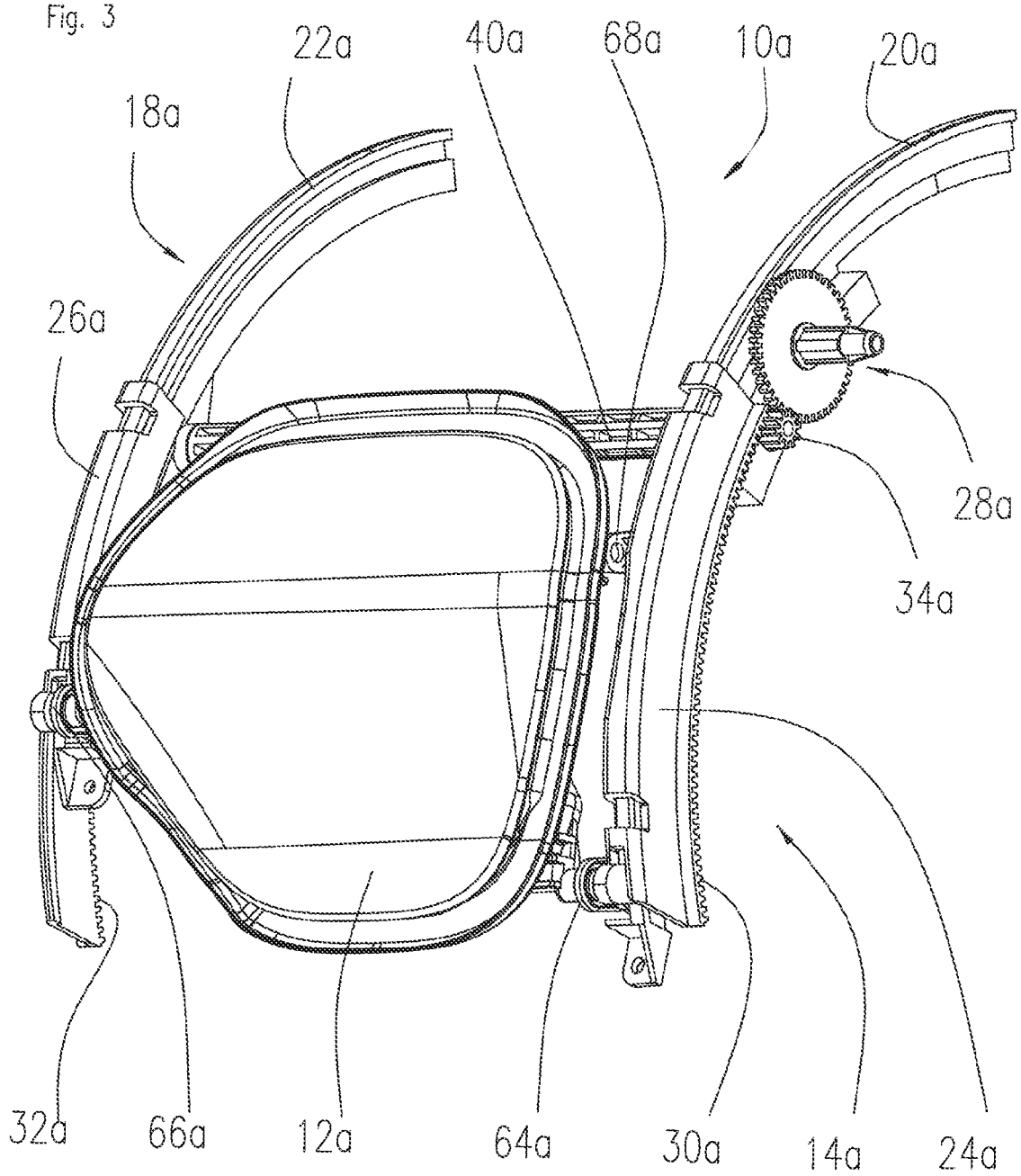
FIG. 3 shows a further perspective view of the closure device without an actuator.
Figure 4:
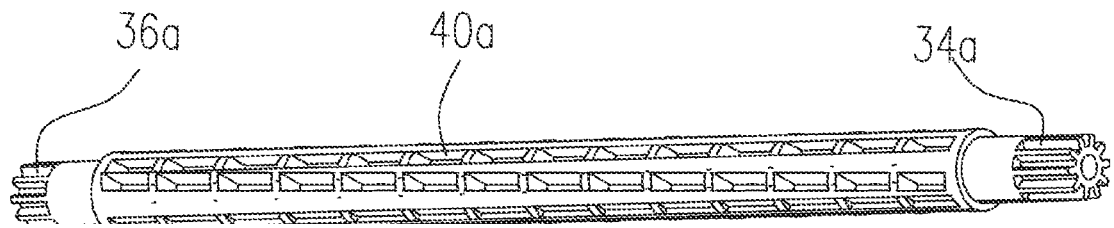
FIG. 4 shows a cross shaft of the closure device.
Figure 5:
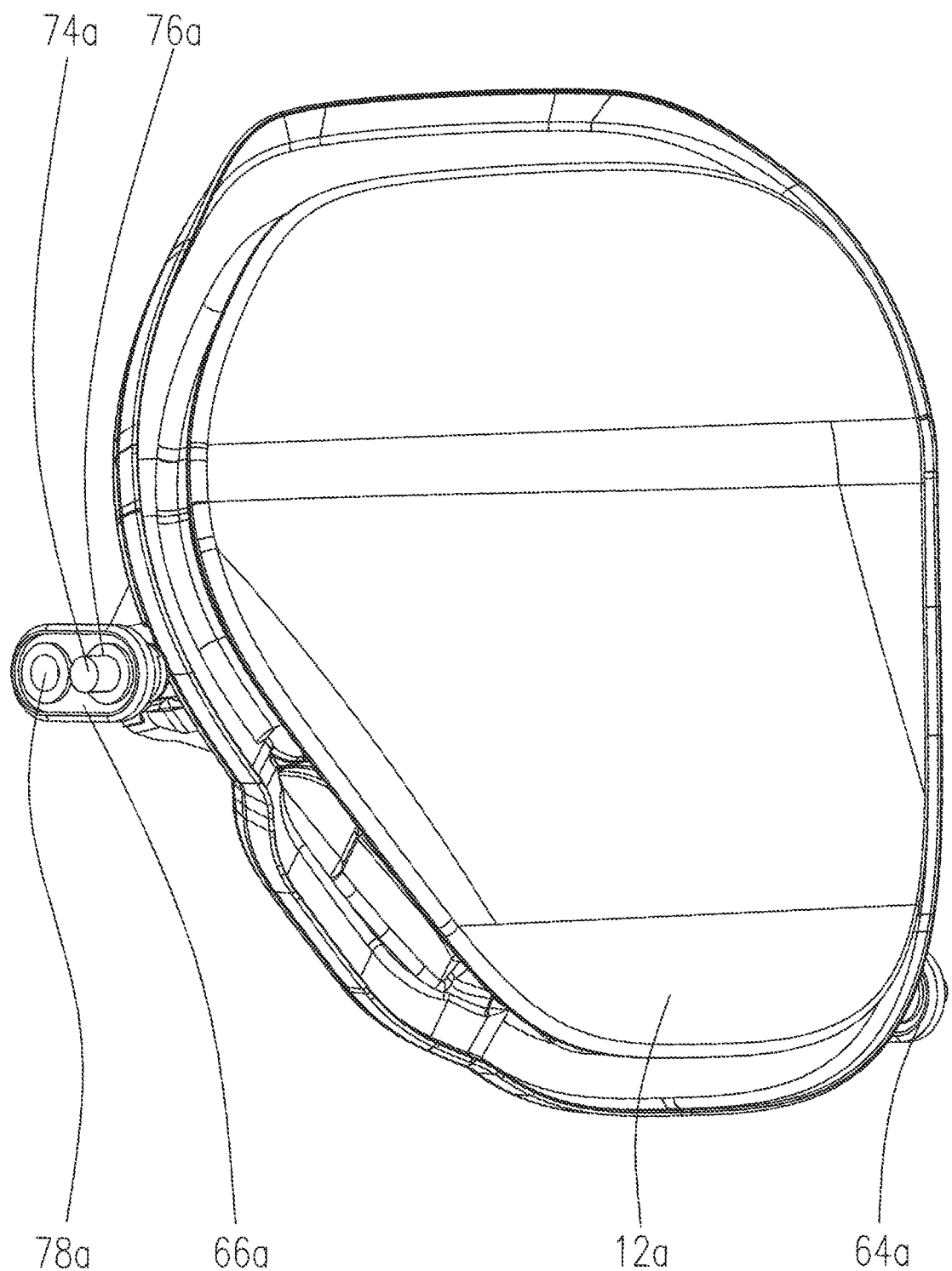
FIG. 5 shows a perspective view of the flap element of the closure device.
Figure 6:
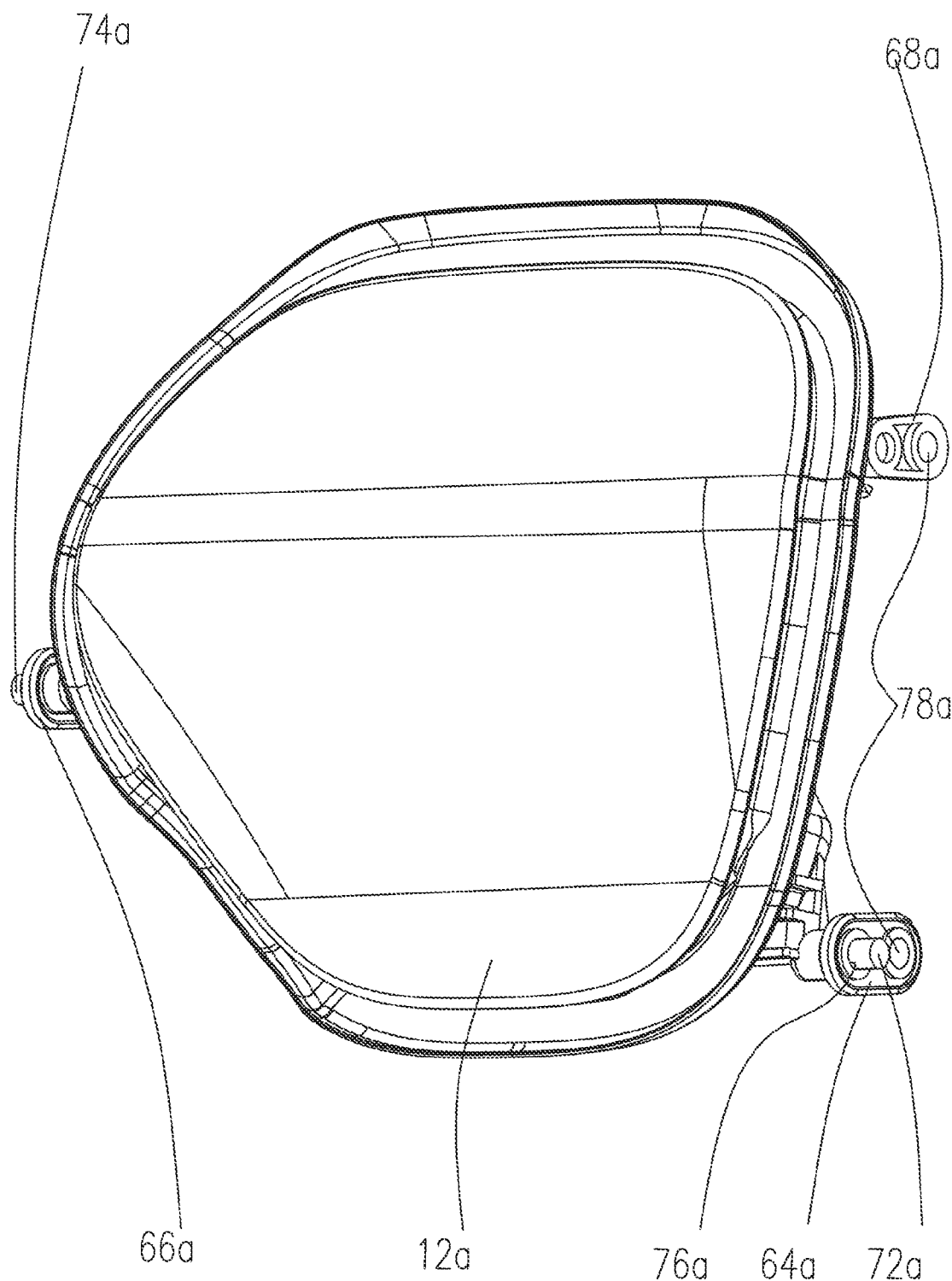
FIG. 6 shows a further perspective view of the flap element of the closure device.
Figure 7:
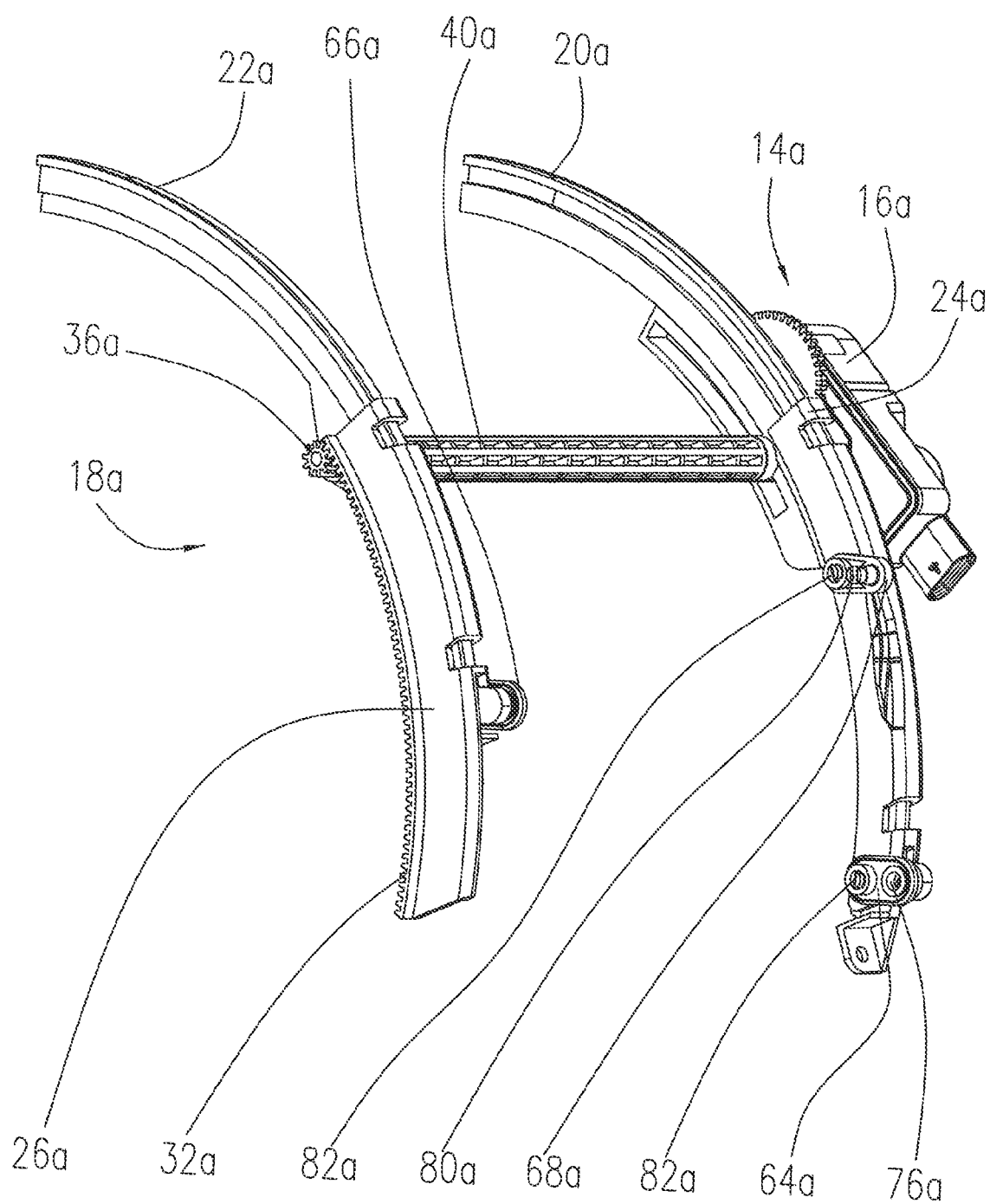
FIG. 7 shows a further perspective view of the closure device without flap element.
Figure 8:
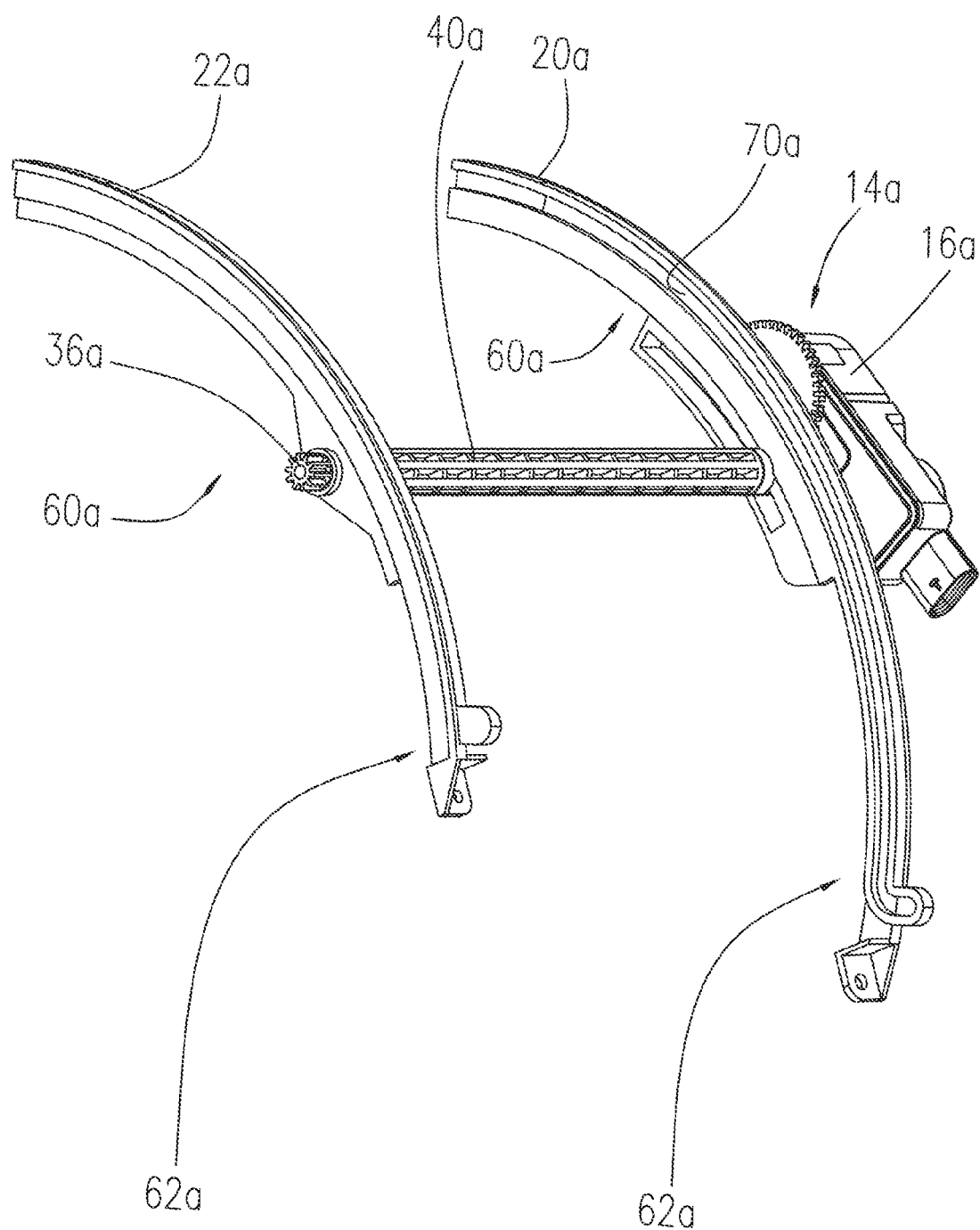
FIG. 8 shows a further perspective view of the closure device without flap element and without carriage.
Figure 9:
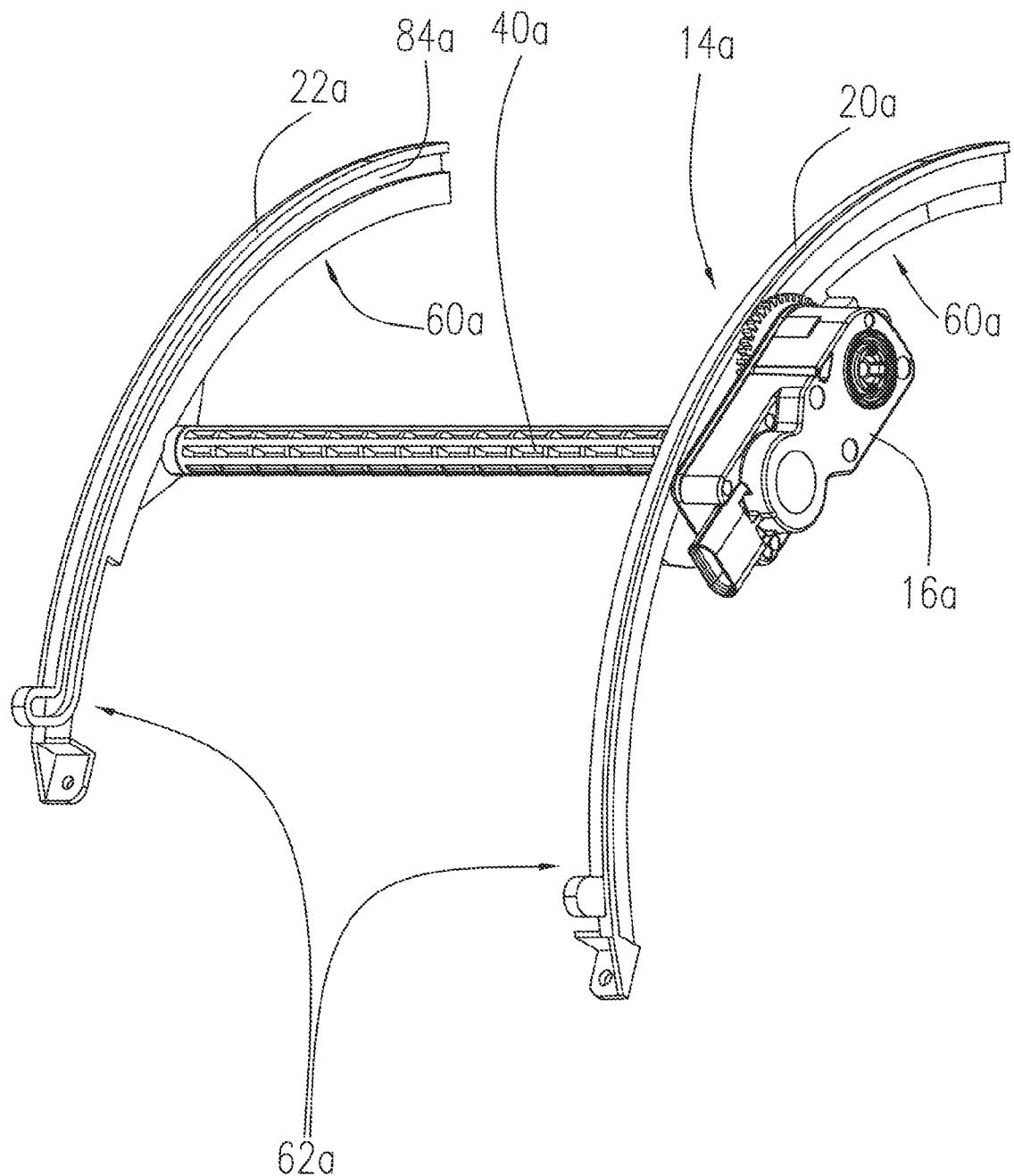
FIG. 9 shows a further perspective view of the closure device without flap element and without carriage.

FIGS. 1 to 9 show various views, or partial views, of a closure device 10a for a charging or tank flap of an automotive vehicle. The closure device 10a includes a flap element 12a for closing a body opening of the automotive vehicle, behind which the charging connection or a tank connector of the automotive vehicle is situated. To traverse the flap element 12a between a closed position and an open position, the closure device 10a includes a drive unit 14a. FIGS. 1 to 3 show the flap element 12a in the closed position. The drive unit 14a comprises an electric actuator 16a and a guide unit 18a. In a state of the closure device 10a installed in the automotive vehicle, the guide unit 18a is entirely accommodated within a body of the automotive vehicle. The guide unit 18a includes two guide rails 20a, 22a extending in parallel to one another. The actuator 16a of the drive unit 14a is arranged at one guide rail 20a. The guide rails 20a, 22a extend within the body of the automotive vehicle, in particular, at least essentially parallel to a contour of the body. Moreover, the guide unit 18a comprises two carriages 24a, 26a which are arranged to be traversable on the guide rails 20a, 22a and on which the flap element 12a is arranged. The flap element 12a is arranged between the guide rails 20a, 22a and is linked to the carriages 24a, 26a via three pivotable connecting elements 64a, 66a, 68a.

The drive unit 14a includes a gear unit 28a in addition to the actuator 16a. The gear unit 28a is provided to synchronously transmit a drive movement generated by the actuator 16a to both carriages 24a, 26a. The gear unit 28a is arranged at the guide rail 20a at which the actuator 16a is also arranged. To transform a rotatory movement generated by the actuator 16a to a movement of the carriages 24a, 26a, each of the carriages 24a, 26a has a rack 30a, 32a. Each of the racks 30a, 32a of the carriages 24a, 26a meshes with a gear 34a, 36a driven by the actuator 16a, in particular via the gear unit 28a. The racks 30a, 32a of the carriages 24a, 26a are provided to convert a rotatory movement of each of the gears 34a, 36a driven by the actuator 16a to a movement of each of the carriages 24a; 26a along each of the guide rails 20a, 22a.

To achieve synchronous operation of the carriages 24a, 26a, the drive unit 14a includes a cross shaft 40a driven by the gear unit 28a. The cross shaft 40a extends between the two guide rails 20a, 22a. The cross shaft 40a is rotatably supported in the guide rails 20a, 22a. The cross shaft 40a bears a pinion gear 34a, 34b at each of its ends, which meshes with a rack 30a, 32a of a carriage 24a, 26a.

During opening or closing of a charging or tank flap, the guide rails 20a, 22a define the traversing path of the flap element 12a. Each of the guide rails 20a, 22a has a traversing region 60a and a lifting region 62a. During traversal of the flap element 12a along the traversing regions 60a of the guide rails 20a, 22a, the flap element 12a performs a traversing movement extending essentially in parallel to the body of the automotive vehicle. In the lifting region 62a, the flap element 12a performs a lifting movement extending essentially perpendicular to the traversing movement. To guide the flap element 12a and to generate the traversing movement and the lifting movement of the flap element 12a, each of the guide rails 20a, 22a has a guide groove 70a, 84a. Two guiding pins 72a, 74a of the flap element engage in the guide grooves 70a, 84a. This achieves rail-guiding of the flap element 12a along the guide rails 20a, 22a, or along the guide grooves 70a, 84a of the guide rails 20a, 22a. The guiding pins 72a, 74a of the flap element 12a are passed through openings 76a in two connecting elements 64a, 66a through these two connecting elements 64a, 66a into the guide grooves 70a, 84a of the guide rails 20a, 22a. The two connecting elements 64a, 66a are pivotable about the passed-through guiding pins 72a, 74a of the flap element 12a. The third connecting element 68a is pivotably arranged at the flap element 12a via a pin 80a arranged on the third connecting element 68a in a torque-resistant manner. The carriages 24a, 26a comprise pivoting axles 82a protruding into corresponding openings 78a of the connecting elements 64a, 66a, 68a. The connecting elements 64a, 66a, 68a are pivotably arranged on the carriages 24a, 26a via the pivoting axles 82a.

The guide grooves 70a, 84a of the guide rails 20a, 22a, in the transition from the traversing region 60a to the lifting region 62a of the guide rails 20a, 22a, have a change in direction of at least essentially 90°. The path of the guide grooves 70a, 84a in the lifting region 62a is thus at least essentially perpendicular to the path of the guide grooves 70a, 84a in the traversing region 60a. During a closing operation, the guiding pins 72a, 74a of the flap element 12a follow the guide grooves 70a, 84a, wherein the change in direction of the guide grooves 70a, 84a causes pivoting of the connecting elements 86a, 66a, 68a about the pivoting axles 82a of the carriage elements 24a, 26a. Pivoting of the connecting elements 64a, 66a, 68a, in turn, causes a lifting movement of the flap element 12a linked to the connecting elements 64a, 66a, 68a. In the closed position of the flap element 12a, the connecting elements 64a, 66a assume a toggle-joint position, thus achieving self-locking of the flap element 12a in the closed position.

During a closing operation, the flap element 12a, due to the guiding by the guide rails 70a, 84a, is first displaced in parallel to a body of the vehicle toward an access opening by a traversing movement, and is subsequently lifted into the access opening by a lifting movement, thus closing it. During an opening operation, the flap element 12a is first displaced in an almost perpendicular direction by a lowering movement opposing the lifting movement so that the flap element 12a is offset in parallel toward the interior of the body of the automotive vehicle. The subsequent traversing movement causes the flap element 12a to be displaced in a direction almost parallel to the body, thus exposing an access opening.

FIGS. 10 to 18 show a further example of the invention. The following description and the drawings are essentially limited to the differences between the examples, wherein, with reference to similarly-designated components, in particular in relation to components having the same reference numerals, reference can basically be made to the drawings and/or the description of the other example. To differentiate between the examples, the letter a has been appended to the reference numerals of the examples of FIGS. 1 to 9. In the example of FIGS. 10 to 18, letter a has been replaced by letter b.

Figure 10:
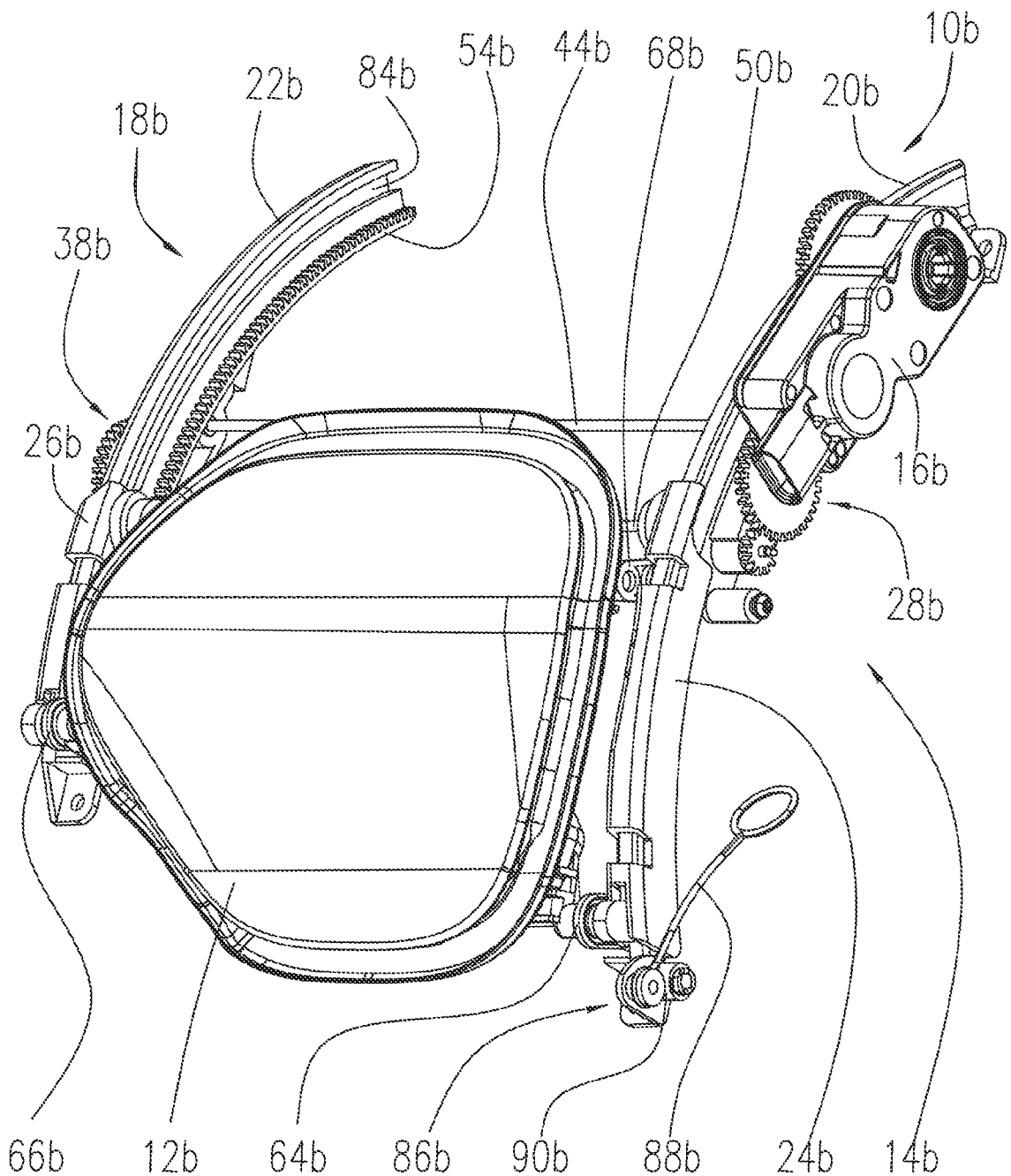
FIG. 10 shows a perspective view of an alternative closure device for a charging or tank flap.
Figure 11:
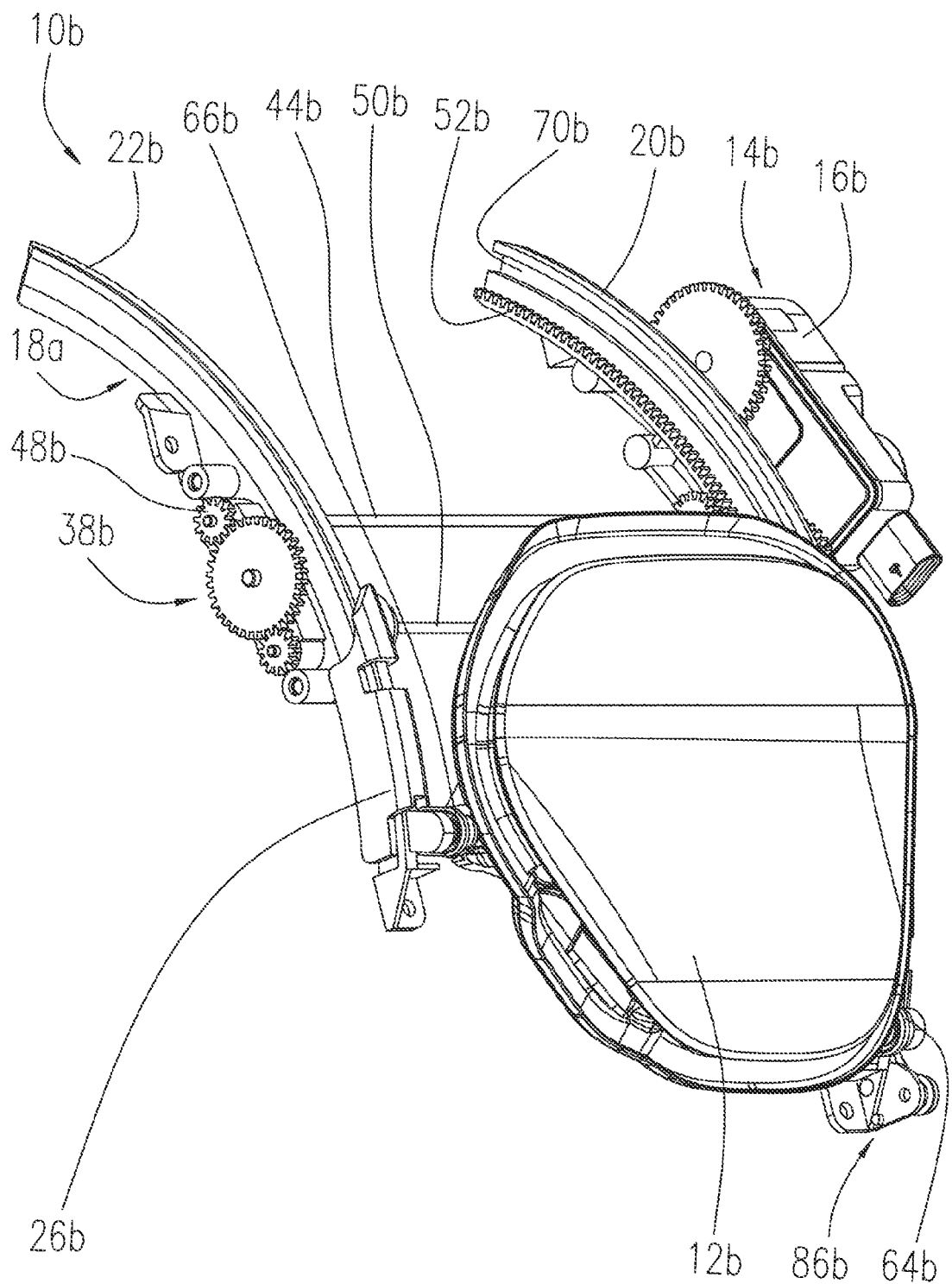
FIG. 11 shows a further perspective view of the closure device of FIG. 10.
Figure 12:
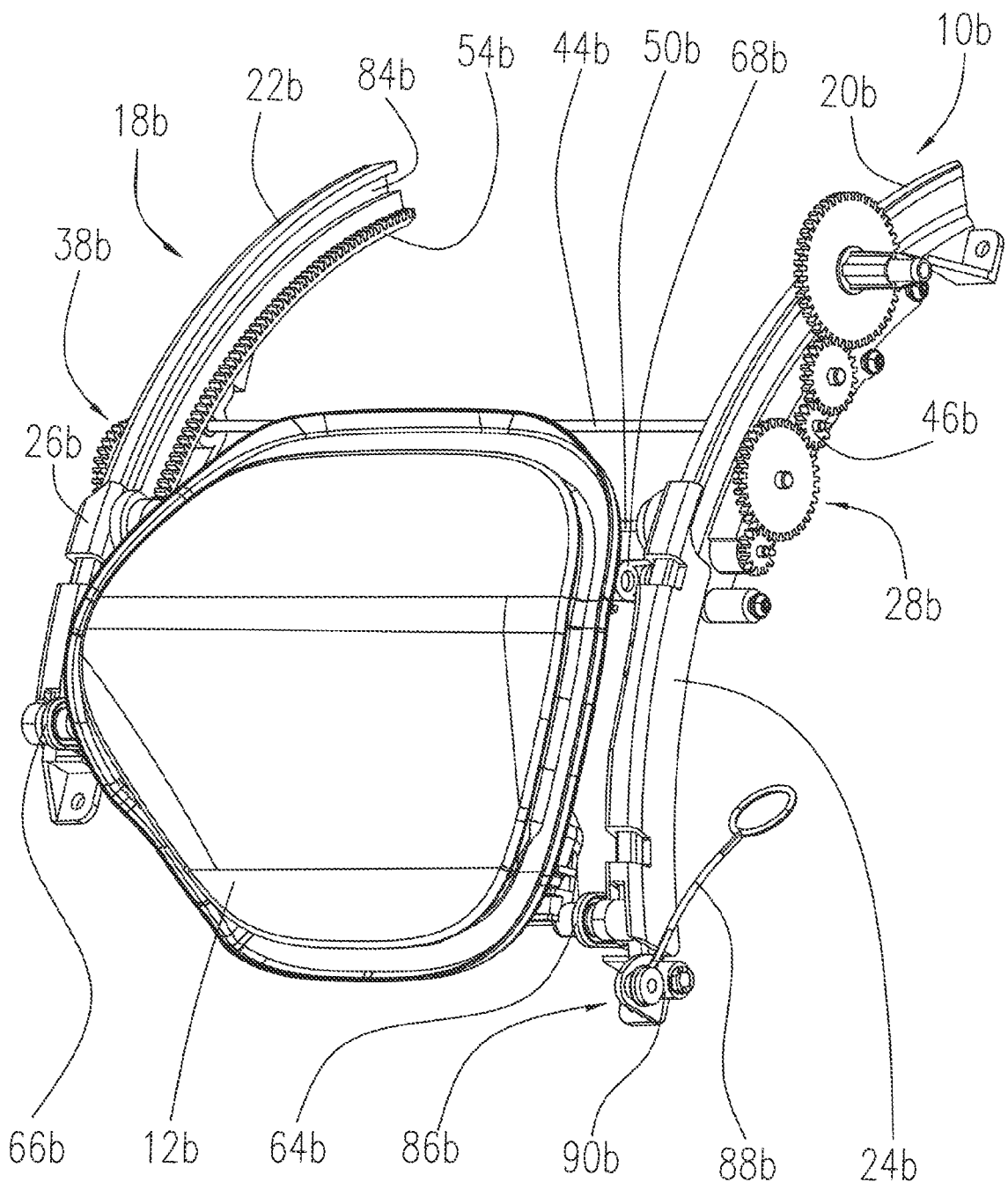
FIG. 12 shows a further perspective view of the closure device of FIG. 10 without actuator.
Figure 13:
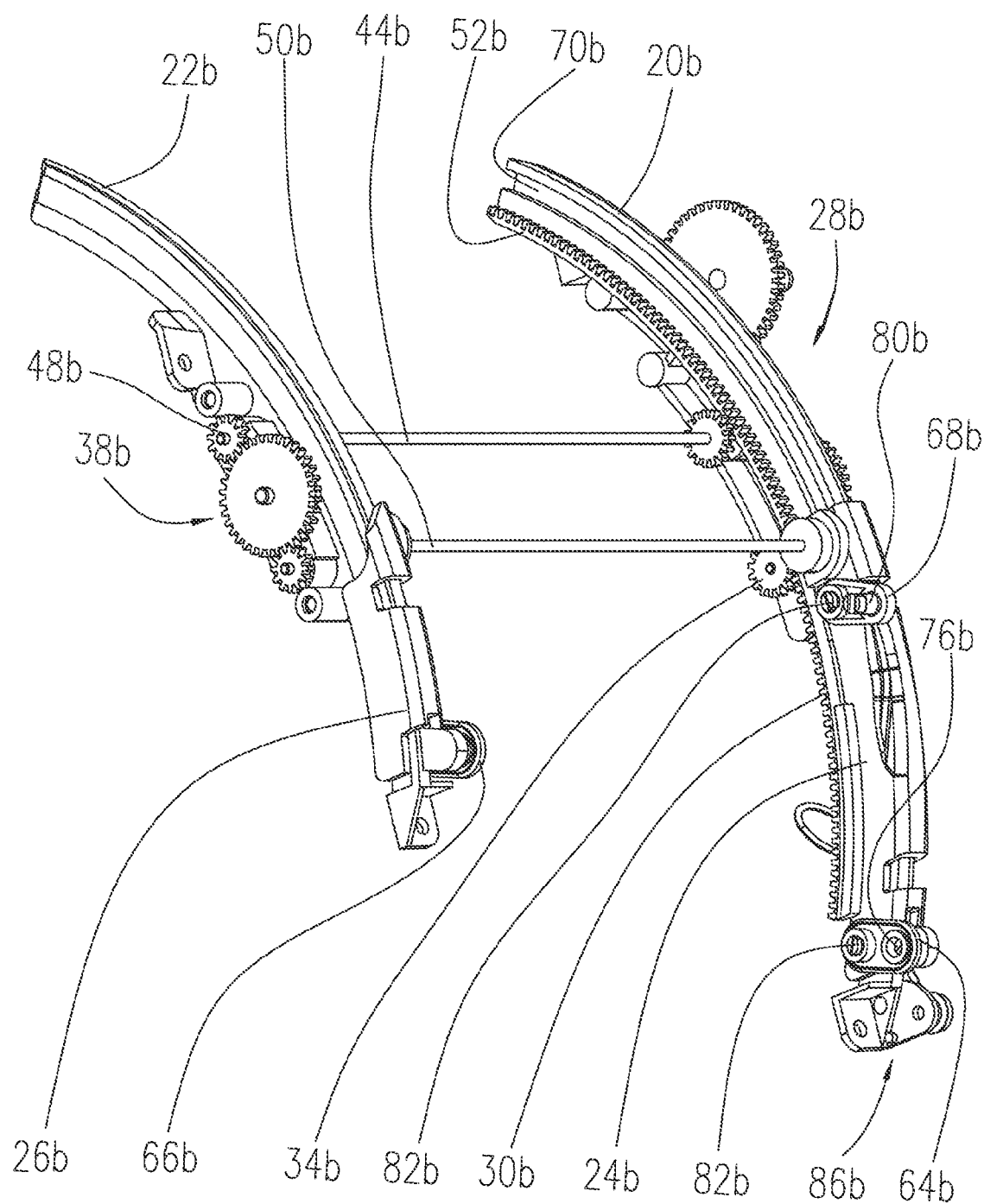
FIG. 13 shows a further perspective view of the closure device of FIG. 10 without actuator and without flap element.
Figure 14:
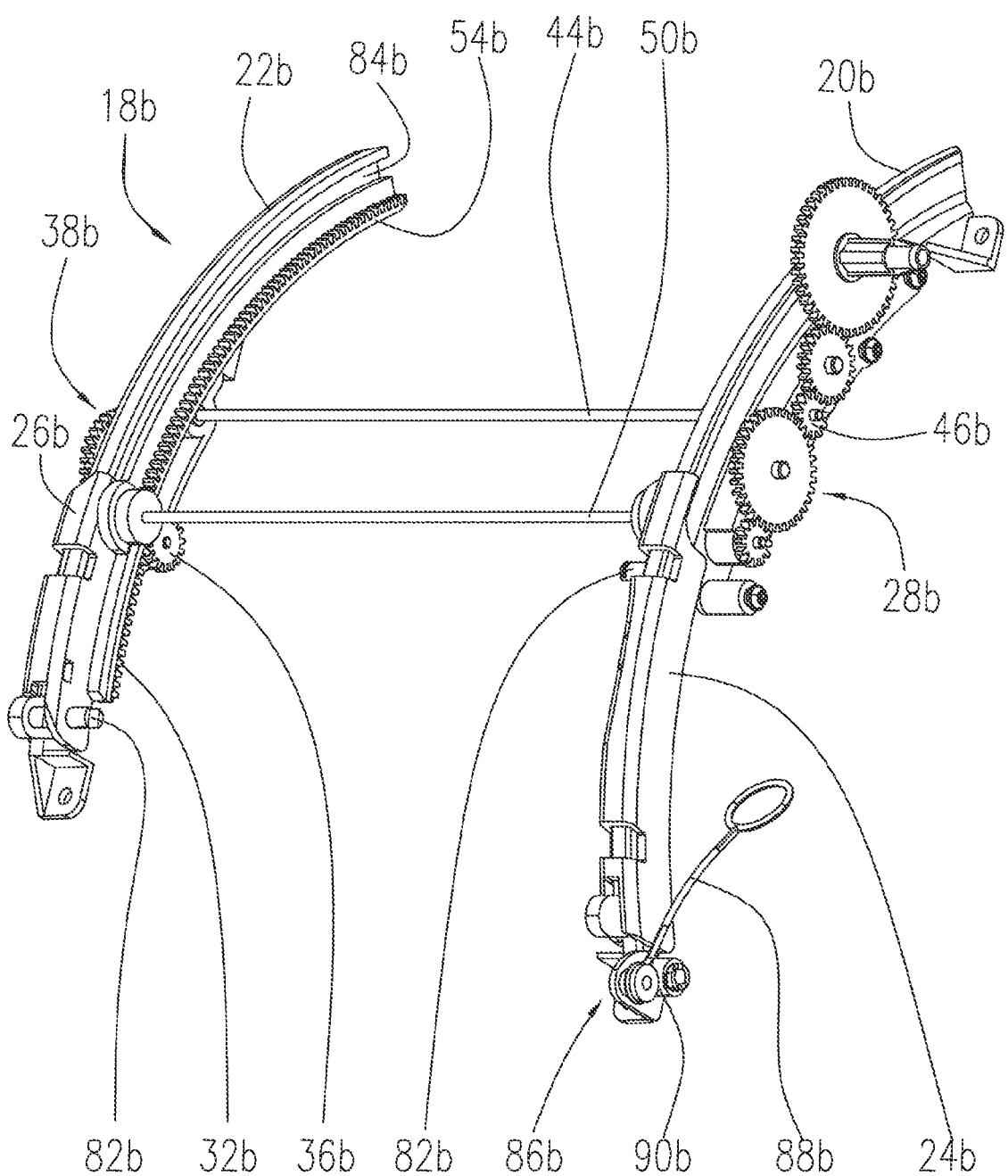
FIG. 14 shows a further perspective view of the closure device of FIG. 10 without actuator and without flap element.
Figure 15:
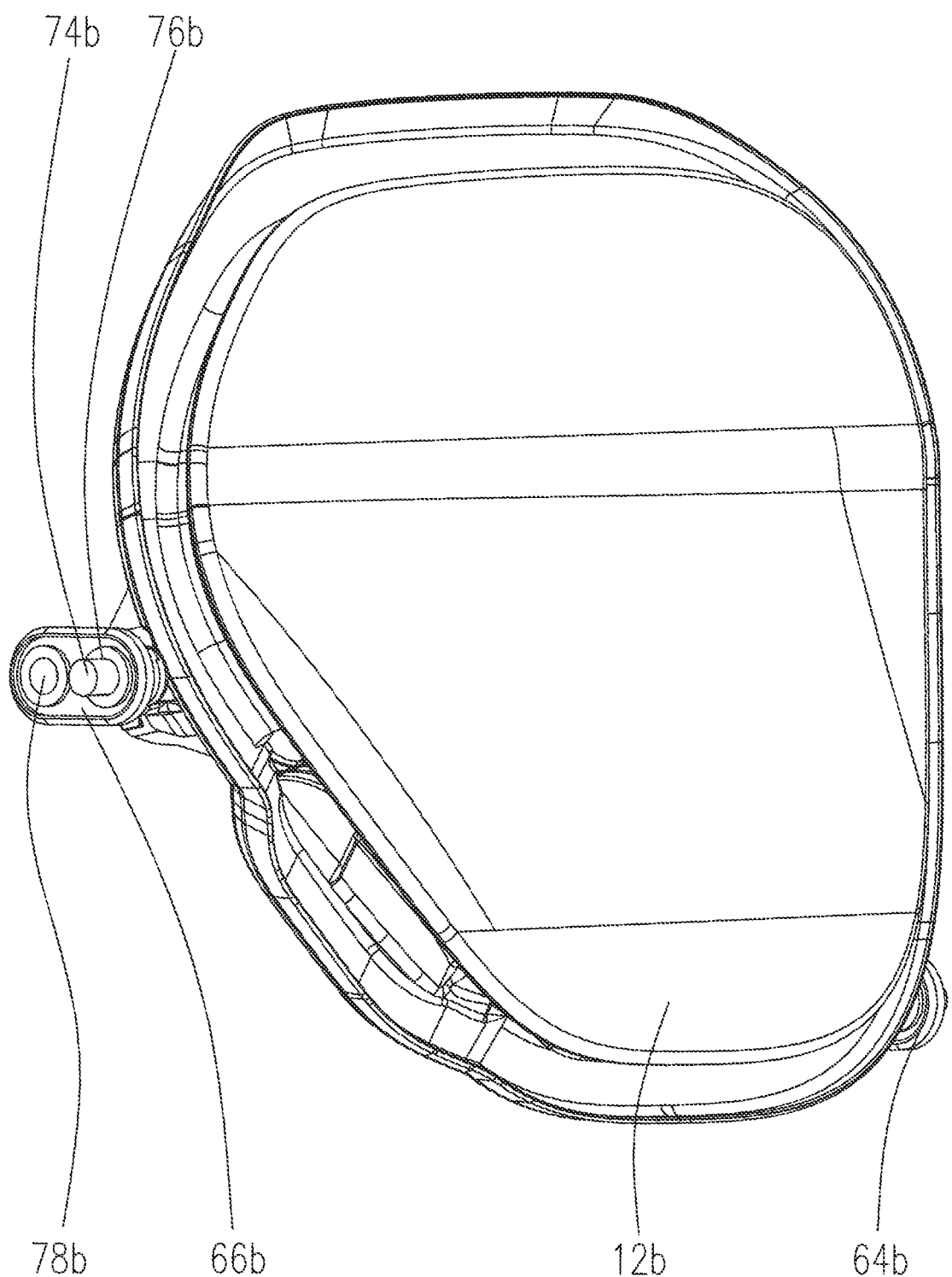
FIG. 15 shows a perspective view of the flap element of the closure device of FIG. 10.
Figure 16:
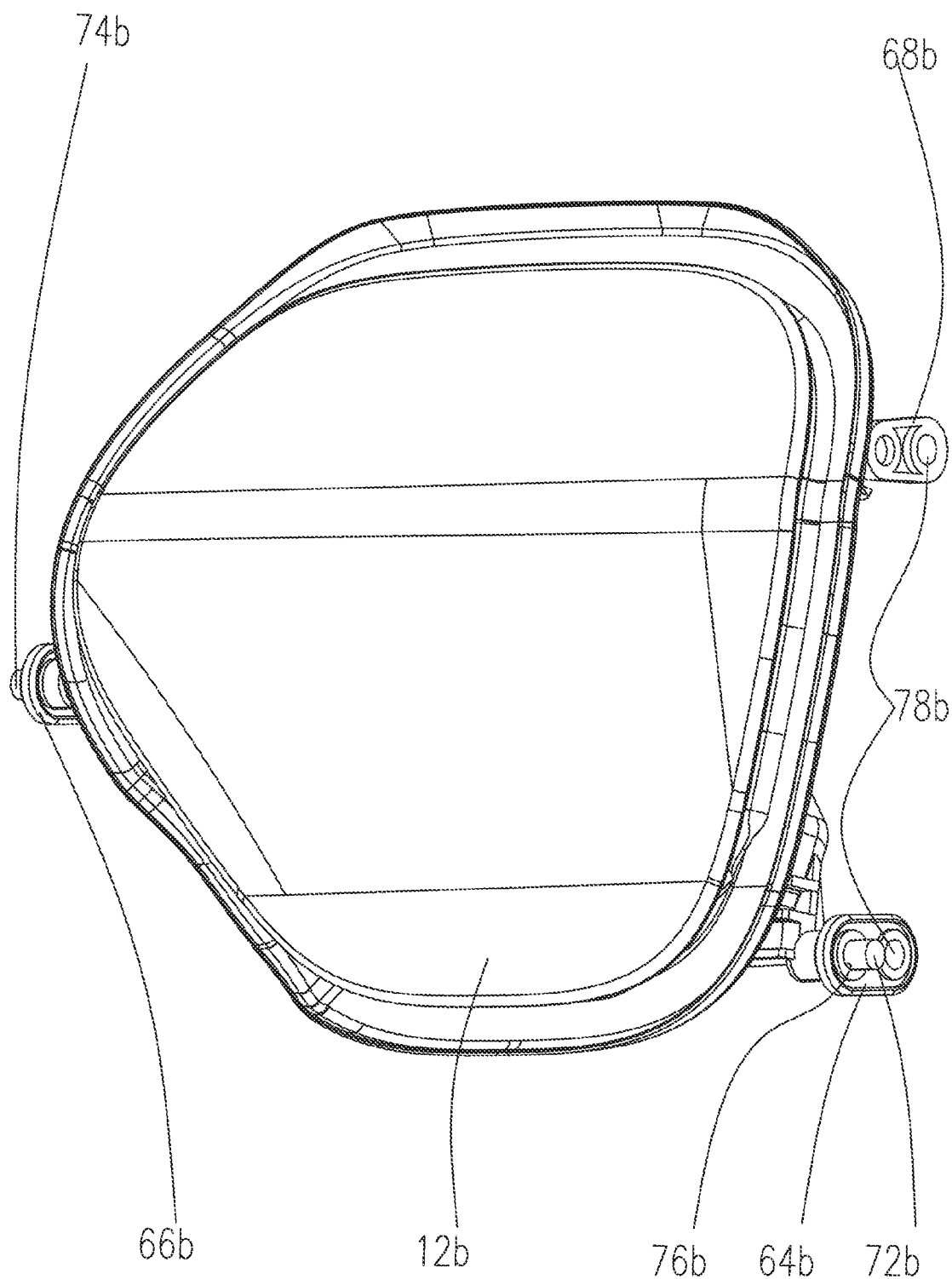
FIG. 16 shows a further perspective view of the flap element of the closure device of FIG. 10.
Figure 17:
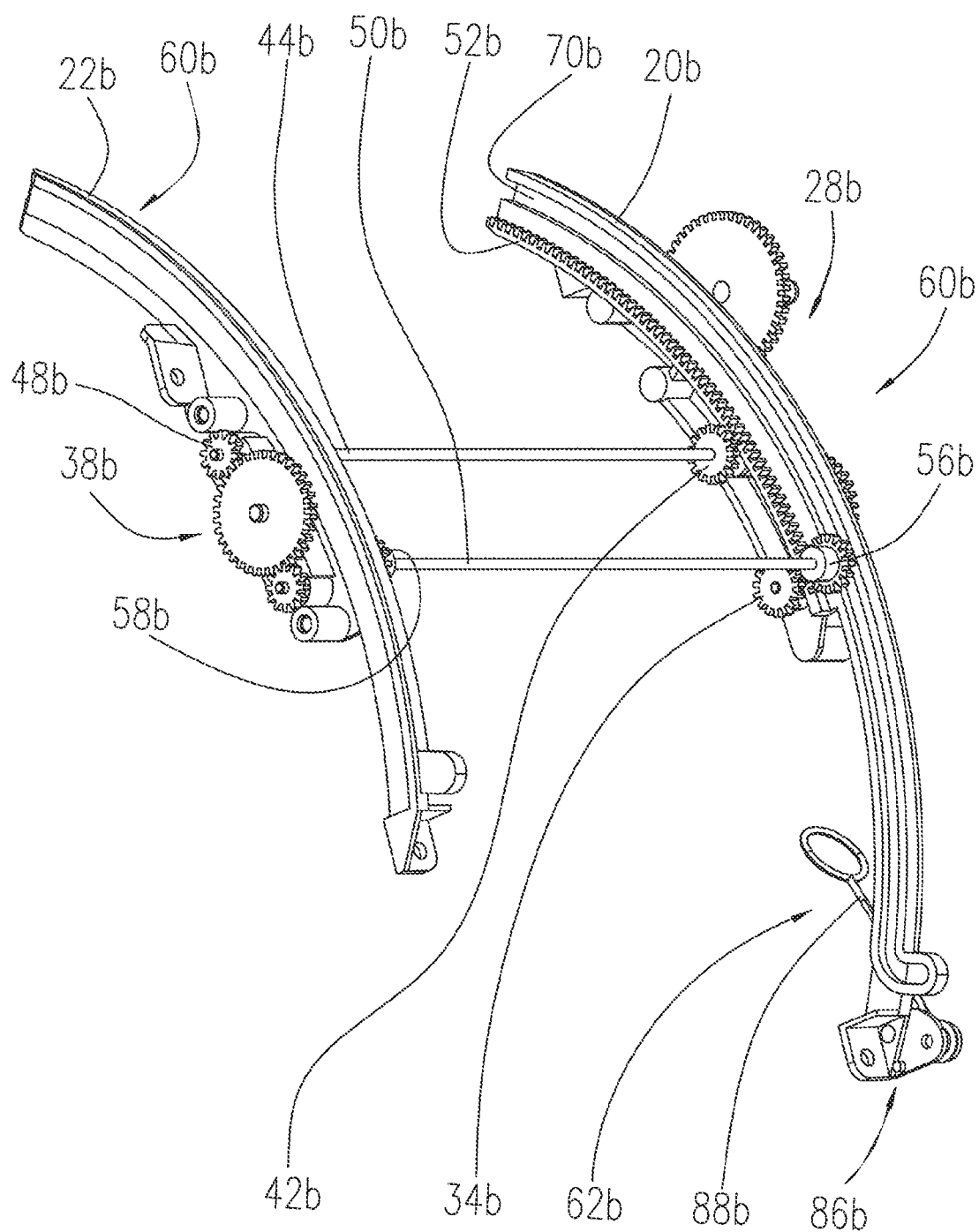
FIG. 17 shows a further perspective view of the closure device of FIG. 10 without actuator, without flap element, and without carriage.
Figure 18:
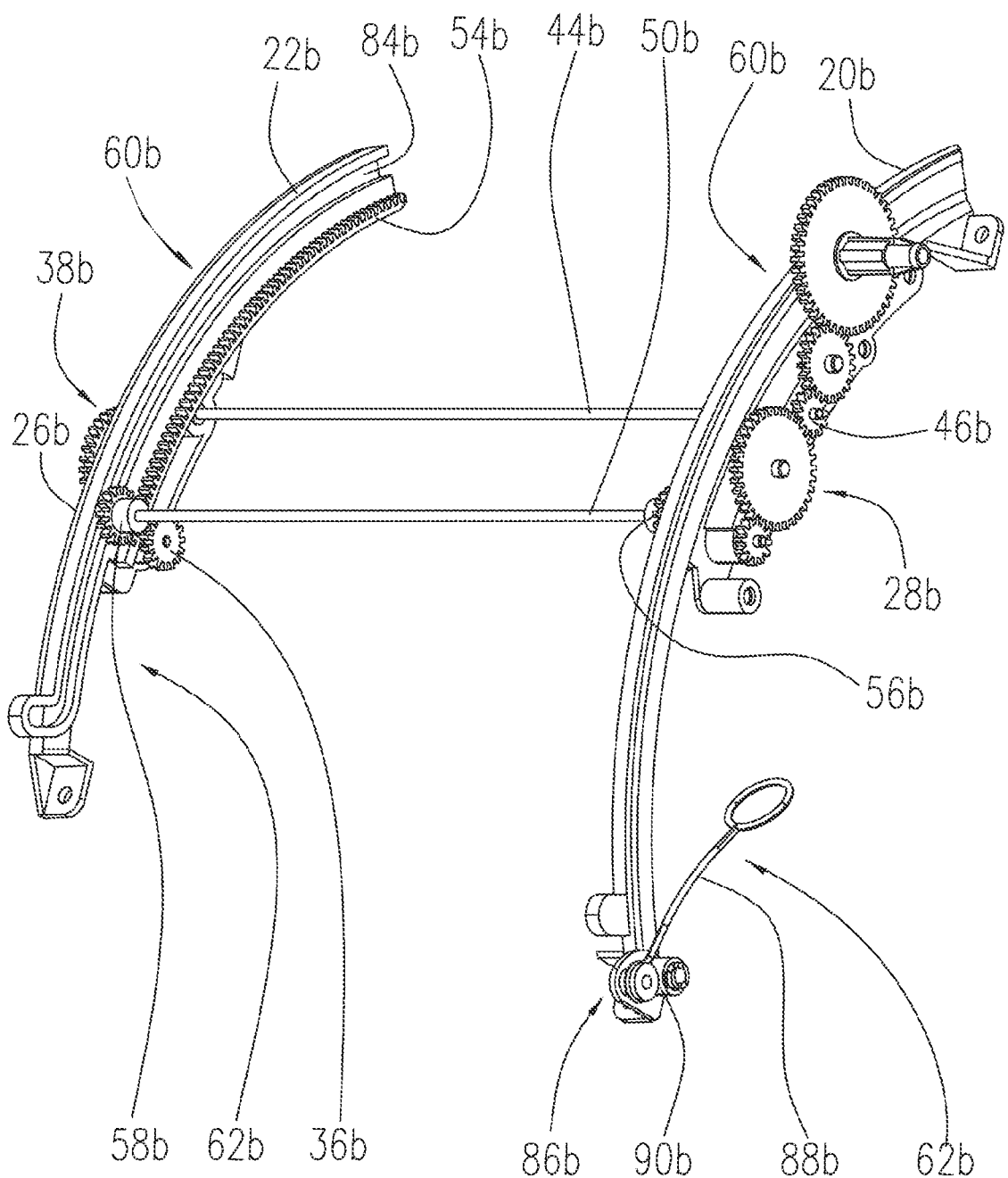
FIG. 18 shows a further perspective view of the closure device of FIG. 10 without actuator, without flap element, and without carriage.

FIGS. 10 to 18 show various views or partial views of an alternatively formed closure device 10b for a charging or tank flap of an automotive vehicle. The closure device 10b includes a flap element 12b for closing a body opening of the automotive vehicle, behind which a charging connector or a filler pipe of the automotive vehicle is arranged. To traverse the flap element 12b between a closed position and an open position the closure device 10b has a drive unit 14b. In FIGS. 10 to 12 the flap element 12b is shown in the closed position. The drive unit 14b comprises an electric actuator 16b and a guide unit 18b. In a state of the closure device 10b installed in an automotive vehicle, the guide unit 18b is entirely accommodated within the body of the automotive vehicle. The guide unit 18b includes two guide rails 20b, 22b extending in parallel to one another. The actuator 16b of the drive unit 14b is arranged at a guide rail 20b. The guide rails 20b, 22b extend within a body of the automotive vehicle, in particular at least essentially parallel to a contour of the body. Furthermore, the guide unit 18b includes two carriages 24b, 26b arranged to be traversable on the guide rails 20b, 22b, and on which the flap element 12b is arranged. The flap element 12b is disposed between the guide rails 20b, 22b and linked to the carriages 24b, 26b via three pivotable connecting elements 64b, 66b, 68b.

In contrast to the closure device 10a shown in FIGS. 1 to 10, the drive unit 14b of the closure device 10b includes two gear units 28b, 38b. The gear units 28b, 38b are provided for synchronous transmission of a drive movement generated by the actuator 16b to both carriages 24b, 26b. Each of the gear units 28b, 38b is arranged at one of the guide rails 20b, 22b. To convert a rotatory movement generated by the actuator 16b to a movement of the carriages 24b, 26b, each of the carriages 24b, 26b has a rack 30b, 32b. Each of the gear units 28b, 38b directly drives at least one pinion gear 34b, 36b, 42b each of which meshes with a rack 30b, 32b of a carriage 24b, 26b. The racks 30b, 32b of the carriages 24b, 26b are provided to convert a rotatory movement of each of the pinion gears 34b, 36b, 42b to a movement of each carriage 24b, 26b along each of the guide rails 20b, 22b.

To achieve synchronous operation of the gear units 28b, 38b and thus synchronous operation of the carriages 24b, 26b, the drive unit 14b includes a first cross shaft 44b driven by a first one of said gear units 28b. The first cross shaft 44b extends between the guide rails 20b, 22b and is rotatably supported in the guide rails 20b, 22b. The first cross shaft 44b transmits a rotatory movement of a gear 46b of the first gear unit 28b to an input gear 48b of the second gear unit 38b. The first cross shaft 44b has an actuator-side pinion gear 42b which meshes with the rack 30b of the actuator-side carriage 24b as a function of a traversing position of the actuator-side carriage 24b. The actuator-side gear 42b of the first cross shaft 44b is provided to perform driving of the carriage 24b when it is traversed out of the engagement region of a first gear 34b driving the carriage 24b.

Furthermore, the drive unit 14b has a second cross shaft 50b. The second cross shaft 50b extends between the two carriages 24b, 26b. The ends of the second cross shaft 50b are rotatably supported in the carriages 24b, 26b. The cross shaft 50b is driven by a movement of the carriage 24b. The movement of the carriage 24b is transmitted to the second carriage 26b by the second cross shaft 50b. Each of the guide rails 20b, 22b of the guide unit 18b has a rack 52b, 54b. The second cross shaft 50b has a pinion gear 56b, 58b at each of its ends, wherein each of the pinion gears 56b, 58b meshes with a rack 52b, 54b of one of the guide rails 20b, 22b.

During opening or closing of a charging or tank flap, the guide rails 20b, 22b define the traversing path of the flap element 12b. Each of the guide rails 20b, 22b has a traversing region 60b and a lifting region 62b. During traversal of the flap element 12b along the traversal ranges 60b of the guide rails 20b, 22b, the flap element performs a traversing movement at least essentially parallel to the body of the automotive vehicle. In the lifting region 62b, the flap element 12b performs a lifting movement at least essentially perpendicular to the traversing movement. To guide the flap element 12b and to generate the traversal movement and the lifting movement of the flap element 12b, each of the guide rails 20b, 22b has a guide groove 70b, 84b. Two guiding pins 72b, 74b of the flap element 12b engage in the guide grooves 70b, 84b. This achieves rail-guiding of the flap element 12b along the guide rails 20b, 22b, or along the guide grooves 70b, 84b of the guide rails 20b, 22b. The guiding pins 72b, 74b of the flap element 12b are passed through openings 76b in two connecting elements 64b, 66b through these two connecting elements 64b, 66b into the guide grooves 70b, 84b of the guide rails 20b, 22b. The two connecting elements 64b, 66b are pivotable about the passed-through guiding pins 72b, 74b of the flap element 12b. The third connecting element 68b is arranged on the flap element 12b to be pivotable about a pin 80b arranged on the third connecting element 68b in a torque-resistant manner. The carriages 24b, 26b include pivoting axles 82b protruding into corresponding openings of the connecting elements 64b, 66b, 68b. The connecting elements 64b, 66b, 68b are pivotably arranged on the carriages 24b, 26b via the pivoting axles 82b.

At the transition from the traversing region 60b to the lifting region 62b of the guide rails 20b, 22b, the guide grooves 70b, 84b of the guide rails 20b, 22b have a change in direction of at least essentially 90°. The path of the guide grooves 70b, 84b in the lifting region 62b is thus at least essentially perpendicular to the path of the guide grooves 70b, 84b in the traversing region 60b. During a closing operation, the guiding pins 72b, 74b of the flap element 12b follow the guide grooves 70b, 84b, the change in direction of the guide grooves 70b, 84b causing pivoting of the connecting elements 64b, 66b, 68b about the pivoting axles 82b of the carriage elements 24b, 26b. Pivoting of the connecting elements 64b, 66b, 68b, in turn, causes a lifting movement of the flap element 12b linked to the connecting elements 64b, 66b, 68b. In the closed position of the flap element 12b, the connecting elements 64b, 66b assume a toggle-joint position thus achieving self-locking of the flap element 12b in the closed position.

During a closing operation, the flap element 12b, due to the guiding by the guide rails 70b, 84b, is first displaced in parallel to a body of the vehicle toward an access opening by a traversing movement, and is subsequently lifted into the access opening by a lifting movement, thus closing it. During an opening operation, the flap element 12b is first displaced in an almost perpendicular direction by a lowering movement opposite the lifting movement so that the flap element 12b is offset in parallel into the interior of the body of the automotive vehicle. The subsequent traversing movement causes the flap element 12b to be displaced in a direction almost parallel to the body, thus exposing an access opening.

To traverse the flap element 12b from a closed position into an open position even in a deenergized state of the actuator 16b, an emergency unlocking device 86b is provided. To operate the emergency unlocking device 86b, the latter includes an emergency unlocking pull 88b. Pulling on the emergency unlocking pull 88b acts on a further element 90b connected to emergency unlocking pull 88b of the emergency unlocking device 86b on the carriage 24b in such a manner that it is displaced along the guide rail 20b by a certain distance. This moves the connecting elements 64b, 66b from the toggle joint position and releases the self-locking action of the flap element 12b.

| List of reference numerals | |
|---|---|
| 10 | closure device |
| 12 | flap element |
| 14 | drive unit |
| 16 | actuator |
| 18 | guide unit |
| 20 | guide rail |
| 22 | guide rail |
| 24 | carriage |
| 26 | carriage |
| 28 | gear unit |
| 30 | rack |
| 32 | rack |
| 34 | pinion gear |
| 36 | pinion gear |
| 38 | gear unit |
| 40 | cross shaft |
| 42 | pinion gear |
| 44 | cross shaft |
| 46 | gear |
| 48 | input gear |
| 50 | cross shaft |
| 52 | rack |
| 54 | rack |
| 56 | pinion gear |

-continued

| List of reference numerals | |
|---|---|
| 58 | pinion gear |
| 60 | traversing region |
| 62 | lifting region |
| 64 | connecting element |
| 66 | connecting element |
| 68 | connecting element |
| 70 | guide groove |
| 72 | guiding pin |
| 74 | guiding pin |
| 76 | opening |
| 78 | opening |
| 80 | pin |
| 82 | pivoting axle |
| 84 | guide groove |
| 86 | emergency unlocking device |
| 88 | emergency unlocking pull |
| 90 | element |

What is claimed is:

1. A closure device for a charging or tank flap of an automotive vehicle, comprising a flap element, comprising a drive unit including an electric actuator for traversing the flap element between a closed position and an open position and a guide unit disposed within a body of the automotive vehicle, wherein the guide unit includes two guide rails extending in parallel to one another and two carriages arranged to be traversable on the guide rails, on which the flap element is arranged, wherein the drive unit includes at least one gear unit for the synchronous transmission, to both carriages, of a drive movement generated by the actuator;
wherein each of the carriages comprises a rack, wherein each of the racks is in mesh with a pinion gear directly or indirectly driven by the actuator and provided to transform a rotary movement of each of the pinion gears to a movement of each of the carriages along one of the guide rails;
wherein the drive unit includes a cross shaft, driven by the at least one gear unit, extending between the two guide rails and rotatably supported in the guide rails, wherein the cross shaft carries a pinion gear on each of its ends, which meshes with a rack of a carriage.

2. The closure device according to claim 1, wherein the drive unit includes two gear units arranged at each of the guide rails and provided to synchronously transmit a drive movement of the actuator to both carriages.

3. The closure device according to claim 2, wherein each of the gear units directly drives at least one pinion gear each meshing with a rack of a carriage.

4. The closure device according to claim 2, wherein the drive unit includes a cross shaft driven by a first one of the said gear units, which transmits a rotary movement of a gear of the first gear unit to an input gear of the second gear unit.

5. The closure device according to claim 4, wherein the cross shaft extends between the guide rails and is rotatably supported in the guide rails.

6. The closure device according to claim 4, wherein the cross shaft driven by the first gear unit includes a pinion gear on the actuator side which meshes with the rack of the actuator-side carriage as a function of a traversing position of the actuator-side carriage.

7. The closure device according to claim 1, wherein the drive unit has a cross shaft extending between the two carriages and the ends of which are rotatably supported in the carriages, wherein driving of the cross shaft is caused by a movement of at least one carriage.

8. The closure device according to claim 7, wherein each of the guide rails of the guide unit has a rack and the cross shaft has a pinion gear on each of its ends, each meshing with a rack of one of the guide rails.

9. The closure device according to claim 1, wherein each of the guide rails has a traversing region in which the flap element performs a traversing movement at least essentially in parallel to the body, and a lifting region in which the flap element performs a lifting movement at least essentially perpendicular to the traversing movement.

10. The closure device according to claim 1, wherein the flap element is arranged between the guide rails and is linked to the carriages via pivotable connecting elements.

11. The closure device according to claim 1, wherein each of the guide rails has a guide groove.

12. The closure device according to claim 11, wherein the flap element includes guiding pins engaging in the guide grooves of the guide rails.

13. The closure device according to claim 12, wherein each of the guide rails has a traversing region in which the flap element performs a traversing movement at least essentially in parallel to the body, and a lifting region in which the flap element performs a lifting movement at least essentially perpendicular to the traversing movement, wherein the guide grooves of the guide rails have a change in direction of at least essentially 90° at the transition from the traversing region to the lifting region.

14. A closure device for a charging or tank flap of an automotive vehicle, comprising a flap element, comprising a drive unit including an electric actuator for traversing the flap element between a closed position and an open position and a guide unit disposed within a body of the automotive vehicle, wherein the guide unit includes two guide rails extending in parallel to one another and two carriages arranged to be traversable on the guide rails, on which the flap element is arranged, wherein the drive unit includes at least one gear unit for the synchronous transmission, to both carriages, of a drive movement generated by the actuator, wherein the drive unit includes two gear units arranged at each of the guide rails and provided to synchronously transmit a drive movement of the actuator to both carriages and wherein each of the gear units directly drives at least one pinion gear each meshing with a rack of a carriage.

* * * * *